United States Patent [19]

Scarola et al.

[11] 4,132,857

[45] Jan. 2, 1979

[54] ELECTRICAL CABLE

[75] Inventors: Leonard S. Scarola, Union; Charles E. White, Plainfield, both of N.J.

[73] Assignee: Union Carbide Corporation, New York, N.Y.

[21] Appl. No.: 171,358

[22] Filed: Aug. 12, 1971

[51] Int. Cl.$^2$ .............................. H01B 7/18; B32B 7/02; B32B 15/18

[52] U.S. Cl. .................................. 174/107; 428/461; 428/516; 428/520

[58] Field of Search ............... 161/175, 172, 216, 218, 161/254; 174/102 C, 105 R, 107; 156/327, 47, 51, 244; 117/75, 218, 232; 428/461, 516, 520

[56] References Cited

U.S. PATENT DOCUMENTS

| | | | |
|---|---|---|---|
| 3,233,036 | 2/1966 | Jachimowicz | 174/107 |
| 3,264,272 | 8/1966 | Rees | 161/216 |
| 3,344,228 | 9/1967 | Woodland et al. | 161/175 X |
| 3,424,631 | 1/1969 | Peacock | 156/51 |
| 3,459,877 | 8/1969 | Bullock et al. | 174/107 |
| 3,467,569 | 9/1969 | Weber et al. | 161/218 X |
| 3,507,978 | 4/1970 | Jachimowicz | 174/105 |
| 3,547,682 | 12/1970 | Erb | 117/75 |
| 3,600,468 | 8/1971 | Böhme | 161/216 X |
| 3,607,615 | 9/1971 | Ohtsu-shi et al. | 161/218 |
| 3,623,943 | 11/1971 | Altenpohl et al. | 161/218 |
| 3,645,822 | 2/1972 | Widiger | 156/244 |
| 3,661,696 | 5/1972 | Knutson | 161/254 X |
| 3,681,515 | 8/1972 | Mildner | 174/107 |
| 3,687,748 | 8/1972 | Clock et al. | 161/216 |
| 4,049,904 | 9/1977 | Hori et al. | 428/215 |

*Primary Examiner*—William R. Dixon, Jr.
*Attorney, Agent, or Firm*—Francis M. Fazio

[57] ABSTRACT

A means of obtaining improved adhesion of the jacket to the metal sheath of an electrical conductor involving the use of a dual layer film as the material for adhering the two to each other is disclosed. The dual layer film contains a film layer of an ethylene/acrylic acid copolymer or an ethylene/methacrylic acid copolymer or the ionomer salts thereof and a film layer of polyethylene or an ethylene/acrylyl ester copolymer or an ethylene/vinyl acetate copolymer.

1 Claim, No Drawings

ELECTRICAL CABLE

BRIEF SUMMARY OF THE INVENTION

This invention relates to a cable sheathing and jacketing having improved adhesion of the polyethylene insulation jacket to the metal sheath of the cable. This improved adhesion is accomplished by the use of a dual film laminate as the adhesive layer between the jacket and the metal sheath. This dual film laminate, which comprises (1) a film layer of (a) an ethylene/acrylic acid copolymer, or (b) an ethylene/methacrylic acid copolymer, or (c) the known ionomer salts thereof and (2) a film layer of either (a) polyethylene, or (b) an ethylene/acrylyl ester copolymer, or (c) an ethylene/vinyl acetate copolymer is obtained and produced by means of a coextrusion process. In this application reference to the ethylene/acrylic acid copolymer or to the ethylene/methacrylic acid copolymer always includes the ionomer salts.

DETAILED DISCLOSURE

In the production of electrical cables a problem has always existed concerning the adhesion of the polyethylene jacket insulation to the metal sheath. Many attempts have been made to improve this adhesion and to date the use of ethylene/acrylic acid copolymer or ethylene/methacrylic acid copolymer as the adhesive layer has been one of the means by which this has been successfully accomplished. Even though some measure of success has been obtained the search continues for further improvements because of the effect observed on the adhesion when the acrylic acid or methacrylic acid content of the copolymer is increased. While an increase in the acrylic acid or methacrylic acid content of the polymer causes an increase in adhesion to the metal sheath, it has also resulted in a decrease in the adhesion to the polyethylene jacket. The converse is also true, an increase in the adhesion to the polyethylene jacket can be accomplished by decreasing the acrylic acid or methacrylic acid content of the copolymer; this, however, results in a decrease of adhesion to the metal sheath. Another problem which has existed has been in the field of laminate structures used in electrical cable construction. This problem is the weakness of the adhesive bond between the two copolymer films (e.g., polyethylene and ethylene/acrylic acid copolymer films) making up the laminate. It has now been found that this latter problem is relieved to a great extent by production of the dual laminate film by a coaxial coextrusion process such as referred to, for example, in U.S. Pat. Nos. 3,233,761, 3,354,506, 3,547,682, and an article by H. A. Elliot and L. F. Erb, "Coextrusion Coating Technique" Tappi, October, 1969, Volume 52, page 1841.

In accordance with the present invention, an insulated electrical conductor is obtained which has improved adhesion of the polyethylene jacket to the metal sheath. The polyethylene jacket is integrally adhered to the sheath by means of a coextruded laminate, as hereinafter defined, which is (1) a film layer of (a) an ethylene/acrylic acid copolymer, or (b) an ethylene methacrylic acid copolymer, or (c) the ionomer salts thereof and (2) a film layer of (a) polyethylene, or (b) an ethylene/acrylyl ester copolymer, or (c) an ethylene/vinyl acetate copolymer.

The ethylene polymer used as the jacket material can be any of the conventional polymers employed for electrical cable construction. They generally have a melt index of from about 0.05 to about 5 dgm/min., preferably from about 0.05 to about 1 dgm/min and a density of from about 0.915 to about 0.96 g/cc. These polymers are generally blended with fillers, antioxidants, stabilizers, etc., and in some instances contain a minor amount of an olefinic comonomer.

The ethylene/acrylic acid or ethylene/methacrylic acid copolymer or ionomer salts thereof used in the production of the coextruded dual film laminate can contain from 5 to 15 weight percent acrylyl acid, preferably from about 6.5 to about 13 weight percent acrylyl acid, most preferably from about 10 to about 13 weight percent acrylyl acid copolymerized therein. This copolymer can have a melt index of from about 0.5 to 20 dgm/min. The term acrylyl acid is used to include acrylic acid and methacrylic acid.

The acrylyl ester present in the ethylene/acrylyl ester copolymer used in the production of the dual film laminate can be any of the lower alkyl esters of acrylic acid or methacrylic acid having from 1 to about 8 carbon atoms in the alkyl group; it is present at a concentration of from about 5 to 30 weight percent of the copolymer molecule. Illustrative thereof one can mention methyl acrylate, methyl methacrylate, ethyl acrylate, ethyl methacrylate, butyl acrylate, butyl methacrylate, 2-ethylhexyl acrylate, 2-ethylhexyl methacrylate, decyl acrylate, and the like.

The acrylyl acid and acrylyl ester monomers used to produce the copolymers hereinbefore referred to are represented by the formula:

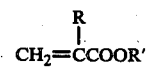

in which R is hydrogen or methyl and R' is hydrogen or alkyl of from 1 to about 8 carbon atoms.

The ethylene/vinyl acetate copolymers used in the production of the dual film laminate are the normally solid resins having a vinyl acetate content up to about 5 percent by weight.

The polyethylene homopolymer that is used in the production of the coextruded dual film laminate structure can have a density of from about 0.91 to about 0.97 g/cc., preferably from 0.91 to about 0.93 g/cc., and a melt index of from about 0.05 to 20 dgm/min., preferably from about 1 to 10 dgm/min. In this application the densities were determined using the test procedure described in ASTM-D 1505-68 and the melt indices were determined using the test procedure described in ASTM-D 1238-65T.

The metal sheath is any of the conventionally employed metals, e.g. copper, aluminum, steel and the like.

As previously indicated the prior art has made use of an ethylene/acrylic acid copolymer as the adhesive in the manufacture of electrical cable. In such methods a film of the copolymer is extruded or laminated onto the metal sheath which is then wrapped around the conductor and the polyolefin jacket is then extruded around that, with the ethylene/acrylic acid copolymer serving as the adhesive to bond the polyolefin jacket to the metal sheath. In the improvement in the instant invention a coextruded dual film laminate comprising (1) a film layer of (a) polyethylene, or (b) ethylene/acrylyl ester copolymer or (c) ethylene/vinyl acetate copolymer and (2) a film layer of (a) ethylene/acrylic acid copolymer or (b) ethylene/methacrylic acid copolymer or (c) the ionomer salts thereof is adhered to the metal sheath and then wrapped around the conductor; the polyolefin jacket insulation is then extruded around this structure.

It was found that the use of the coextruded dual film laminates herein defined resulted in better adhesion to both the metal sheath and the polyolefin jacket than was observed by the use of a film of ethylene/acrylic acid copolymer or ethylene/methacrylic acid copolymer alone. The coextruded dual film laminate is applied to the metal sheath with the ethylene/acrylyl acid copolymer layer thereof in contact with the metal sheath. This laminate can be made with varying thicknesses of each layer. Thus, the ethylene/acrylyl acid copolymer layer of the laminate can be from about 10 to about 90 percent of the total weight of the laminate. It is, however, preferably from about 30 to about 50 percent of the weight thereof. The total thickness can be from about 0.5 mil to about 5 mils, preferably from about 1 mil to about 3 mils.

The improvement in adhesion observed is shown by the following examples:

EXAMPLE 1

A coextruded dual film laminate was produced by simultaneously extruding through a single die two polymers in such manner that the polymers exited from the die as two separate and distinct layers intimately bonded to each other. The polymers were a polyethylene having a melt index of about 4 dgm/min and a density of about 0.924 g/cc. and an ethylene/acrylic acid copolymer containing about 6.5 weight percent polymerized acrylic acid and having a melt index of about 9 dgm/min. In this coextruded dual film structure the polyethylene comprised 65 weight percent of the structure and the copolymer made up the balance. The film laminate had a total thickness of about two mils. The dual laminate was extrusion coated onto an 8 mil thick aluminum sheet as it exited from the coextruder with the ethylene/acrylic acid copolymer layer in contact with the aluminum surface. The composite was cut into samples about six inches square and the polyethylene side thereof was adhered to a plaque of conventional polyethylene jacketing material that had been preheated to 215° C. The entire assembly was kept at that temperature under a pressure of 10 psi for three minutes. It was then quenched and the adhesive bonds determined. The polyethylene cable jacketing had a melt index of 0.23 dgm/min. and a density of about 0.923 g/cc.; the jacket had a thickness of 75 mils. This procedure gives comparable results to those obtained in cable production.

A control was also prepared using as the adhesive layer an ethylene/acrylic acid copolymer having an acrylic acid content of about 6.5 weight percent. This control was prepared under conditions similar to those described above.

The adhesion of the jacket to the sheath, in pounds per inch, was determined using the apparatus described in ASTM-D 638. The specimen used was one inch wide by 6 inches long with a portion at the end separated in order for the material to be gripped by the jaws of the tester. The jaws were pulled apart at a rate of two inches per minute and the average load in pounds per inch of width were recorded after the test specimen had been pulled apart about two inches. This average load is a measure of the adhesion of the jacket to the sheath.

The adhesion of the laminate to the sheath is determined before the jacketing composition is applied following the same procedure described above.

It was found that the adhesive bond to the aluminum sheath of the coextruded dual film laminate was 2.8 lbs/in. and that the adhesive bond of the sheath to the polyethylene jacket was 11.5 lbs/in. In contrast the control showed an adhesive bond to the aluminum sheath of only 1.4 lbs/in. and an adhesive bond of the sheath to the polyethylene jacket of only 9.1 lbs/in. The data show a two-fold increase in adhesion of the laminate to the aluminum sheath and a 26% increase in adhesion of the sheath to the polyethylene jacket versus the control.

EXAMPLE 2

A coextruded dual film laminate was produced by simultaneously extruding through a single die a polyethylene having a melt index of about 4 dgm/min. and a density of about 0.924 g/cc. and an ethylene/acrylic acid copolymer containing 13 weight percent polymerized acrylic acid and having a melt index of about 5 dgm/min. in the same manner as described in Example 1. The dual film laminate was extrusion coated onto an 8 mils thick aluminum sheet, also as described in Example 1, and this composite was used to prepare plaques as described in Example 1, using the same polyethylene jacket material.

The adhesive bond to the aluminum sheath was 3.2 lbs/in and the adhesive bond of the sheath to the polyethylene jacket was 14.2 lbs/in. This data indicates a 2.3 fold increase in adhesion of the laminate to the aluminum sheath and a 56 percent increase in adhesion of the sheath to the polyethylene jacket as compared to the same control used in Example 1.

EXAMPLE 3

A coextruded dual film laminate was produced by simultaneously extruding through a single die two different copolymers and it was extrusion coated on an 8 mil thick aluminum sheet in the same manner as described in Example 1. The outer layer of the laminate was an ethylene/ethyl acrylate copolymer containing about 18 weight percent polymerized ethyl acrylate and having a melt index of about 6 dgm/min. The inner layer in contact with the aluminum sheath was the same ethylene/acrylic acid copolymer described in Example 2. The composite laminate was used to prepare plaques as described in Example 1, using the same polyethylene as the jacket that was used in Example 1.

The adhesive bond to the aluminum sheath was so tenacious that one could not separate the aluminum from the ethylene acrylic acid copolymer layer by the test described without tearing and destroying the laminate. The adhesive bond of the laminate to the jacket was 15.1 lb/in.

What is claimed is:

1. An electrical cable consisting essentially of a conductor core, a metal cable sheathing surrounding said conductor core, a coextruded dual film laminate around said metal cable sheathing and an exterior polyethylene jacketing, said electrical cable having improved adhesion of the polyethylene jacket to the metal sheath with said polyethylene jacket adhered to said sheath by means of the coextruded dual film laminate of (I) a film layer of polyethylene and (II) a film layer of an ethylene/acrylic acid copolymer, said cable sheathing and jacketing surrounding said electrical conductor with said film layer (II) next to the metal sheath and said film layer (I) next to the polyethylene jacket.

* * * * *